(No Model.) 2 Sheets—Sheet 1.
A. B. STEBBINS.
VARIABLE SPEED GEARING FOR BICYCLES, &c.

No. 523,246. Patented July 17, 1894.

Witnesses.
Robert Everett
Thos. A. Green

Inventor.
Alfred B. Stebbins.
By James L. Norris
Atty.

(No Model.) 2 Sheets—Sheet 2.

A. B. STEBBINS.
VARIABLE SPEED GEARING FOR BICYCLES, &c.

No. 523,246. Patented July 17, 1894.

Witnesses.
Robert Everett
Thos. A. Green

Inventor.
Alfred B. Stebbins.
By James L. Norris.
Atty.

UNITED STATES PATENT OFFICE.

ALFRED B. STEBBINS, OF CANISTEO, NEW YORK.

VARIABLE-SPEED GEARING FOR BICYCLES, &c.

SPECIFICATION forming part of Letters Patent No. 523,246, dated July 17, 1894.

Application filed January 8, 1894. Serial No. 496,077. (No model.)

*To all whom it may concern:*

Be it known that I, ALFRED B. STEBBINS, a citizen of the United States, residing at Canisteo, in the county of Steuben and State of New York, have invented new and useful Improvements in Variable-Speed Gearing for Bicycles, &c., of which the following is a specification.

This invention, relates to variable speed and power gearing inclosed in a hollow sprocket wheel and adapted for use on bicycles, tricycles, velocipedes and other vehicles propelled by hand or foot power.

The objects of my invention are to provide an easy running, compact and noiseless gearing of variable speed and power so arranged that extended anti-friction surfaces will be provided and comprising an effective, reliable and easily managed clutch mechanism through which the rider, while mounted on the vehicle, can quickly vary the power and speed of the vehicle without shock or injury to the gearing.

My invention consists in the peculiarities of construction and novel combinations of devices in variable speed and power gearing for vehicles, as hereinafter more particularly described and claimed.

Figure 1:
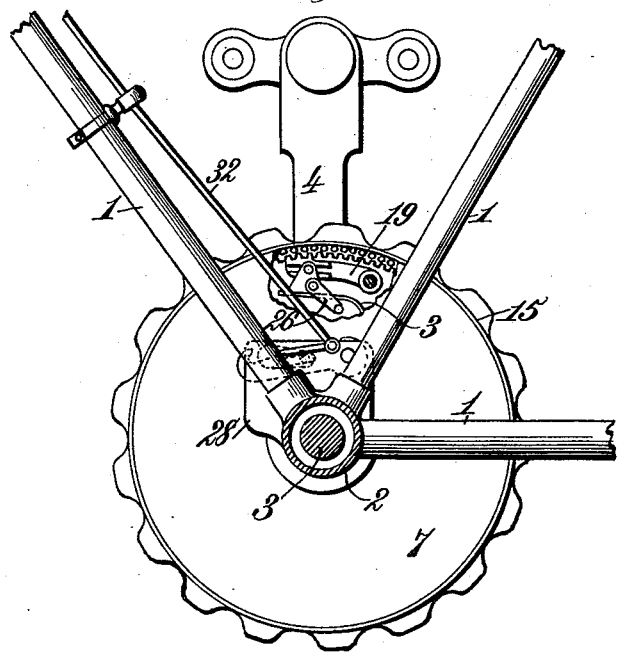
Figure 2:
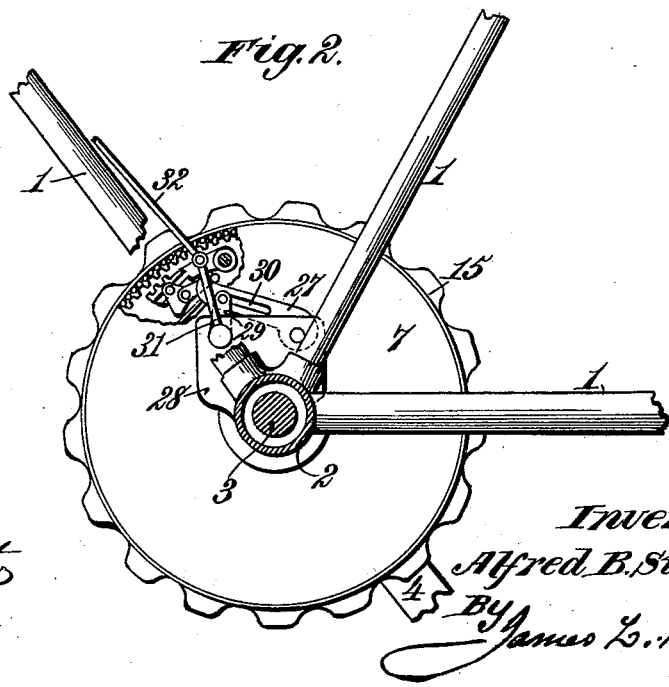
Figure 3:
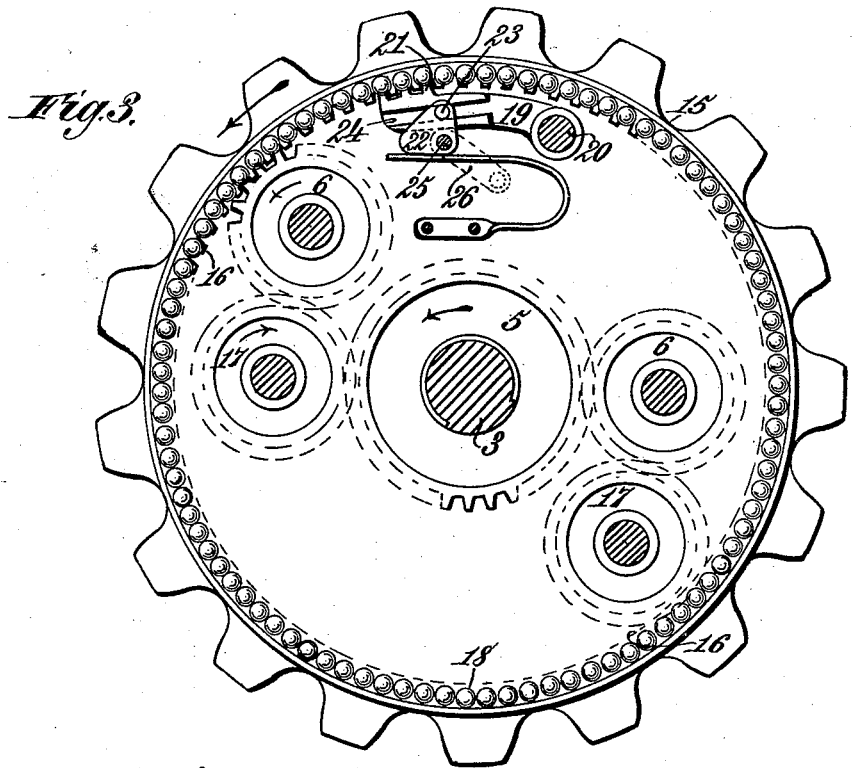
Figure 4:
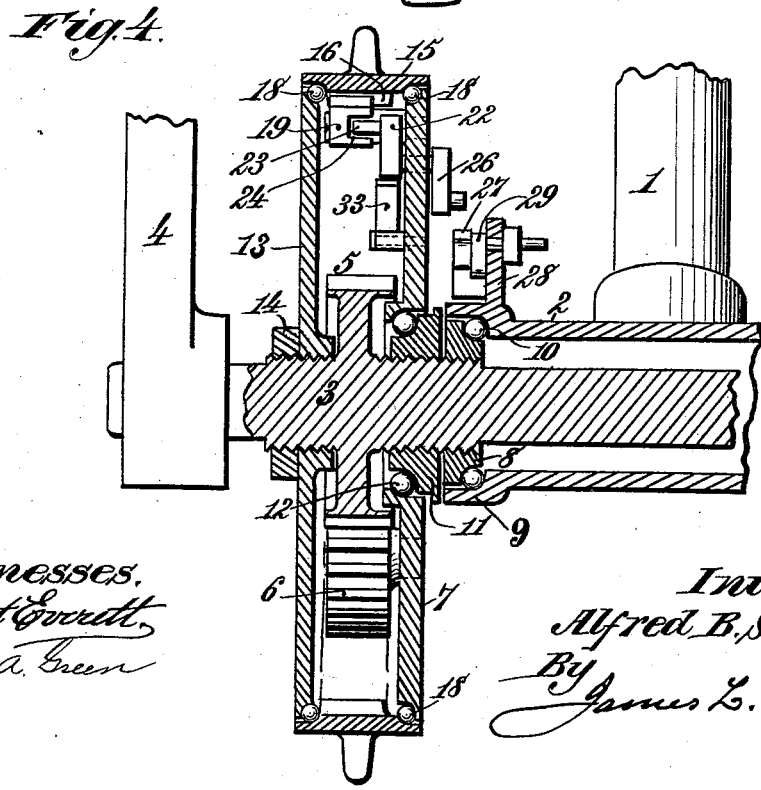

In the annexed drawings illustrating the invention—Figure 1 is a sectional side elevation of my improved variable speed and power gearing applied to a velocipede and partly broken away to show the clutch engaged with the internal gear of a loose sprocket ring forming part of the hollow sprocket wheel, the several parts of the mechanism being in position for speeding the vehicle. Fig. 2 is a similar view showing the clutch disengaged to enable the gearing to increase its power, but with reduction of speed. Fig. 3 is an enlarged vertical longitudinal section of a hollow sprocket wheel constructed according to my improvements and inclosing the variable speed gearing and clutch mechanism. Fig. 4 is a vertical transverse section of the same parallel with the driving shaft or axle.

The reference numeral 1 designates a portion of the stays of a bicycle frame provided with a rigidly supported tubular bearing or bracket 2 that receives the driving shaft or axle 3 to which the pedals or foot cranks 4 are attached.

To the shaft or axle 3 is rigidly secured a spur gear 5 that may be integral with the axle, if preferred. This axle gear 5 meshes with a spur gear 6 mounted on a stud supported by a disk or back plate 7 that is placed loosely on the shaft or axle or on one end of the hub of the axle gear.

I prefer to rigidly secure to the axle 3, or to one end of its gear hub, a collar 8 that is located within an enlarged or flared end portion 9 of the tubular axle bearing or bracket 2 which forms part of the bicycle frame. Between this collar 8 and bearing 9 is arranged an annular series of rollers or balls 10 for giving an anti-friction support to the shaft or axle. To the axle or to the gear-hub, outside the collar 8, is secured a similar collar 11 between which and the circular and flanged central opening of the disk 7 is arranged an annular series of rollers or balls 12 that support the said disk or back plate and diminish friction at that point when the disk is rotated.

A front plate or disk 13 may be cast integral with the shaft or axle 3 or with the outer end of the hub of the axle gear; or said front plate 13 may be screwed into place and be rigidly secured by a jam nut 14, as shown.

The disks 7 and 13 form the opposite sides of a hollow sprocket wheel the periphery of which consists of a sprocketed ring or band 15 having internal gear teeth 16 meshing with a spur gear 17 mounted on a stud carried by the disk or back plate 7, which spur gear 17 meshes with the spur gear 6 that is also carried by said disk and which, in turn, meshes with the axle gear 5, as already explained.

The peripheries of the disks 7 and 13 and the opposite inner side portions of the sprocketed and internally cogged ring or band 15 are formed to serve as bearings for annular series of anti-friction rollers or balls 18 that take the thrust and support the weight of the sprocketed ring. By forming the sprocketed ring 15 separate from both disks 7 and 13 and supporting it thereon through anti-friction bearings composed of balls in direct contact with said ring and disks, without intervention of other parts, the cost of manufacture is greatly reduced without impairing the strength, solidity or durability of the hollow sprocket wheel; friction and wear are more evenly distributed and greatly lessened; and the renewal of worn or broken parts can be effected easily and at comparatively small expense.

The rigid attachment of the front plate or disk 13 to the axle 3 or to the rigidly attached axle gear 5 imparts solidity to the parts and permits the employment of anti-friction bearings at the peripheries of the two disks 7 and 13 where a more extended surface is afforded for their action in reducing friction and diminishing wear. Adjustment to compensate for wear may be accomplished by means of the disk 13 and nut 14, or of the collars 8 and 11 that have a screw threaded connection with the axle or hub of the axle gear and which form part of the ball bearings beneath the back plate of the hollow sprocket wheel.

I prefer to construct the spur gears 6 and 17 of raw hide in order to render the gearing noiseless and to further reduce friction and wear.

On the inner side of the loose disk or back plate 7 is mounted a clutch or dog 19 having one end pivotally supported, at 20, adjacent to the periphery of said disk. The clutch or dog 19 is provided with a series of locking teeth 21 adapted to engage normally with the internal gear 16 of the sprocketed ring 15 that forms the periphery of the hollow sprocket wheel. Between the clutch or dog 19 and the inner side of the loose disk 7 is a cam block 22 having a pin 23 engaged in a groove or slot 24 that is formed longitudinally in said clutch. The cam block 22 is rigidly attached to a pivotal pin or fulcrum 25 that is extended through the loose disk 7 and to the outer end of this pin 25, on the outside of the disk 7, is rigidly secured a crank arm 26 that is arranged in position to be engaged, when desired, by an adjustable stop arm 27 fulcrumed to a plate or lug 28 supported on the tubular bracket 2 or other convenient and fixed part of the machine. To the lug 28 is also fulcrumed a crank arm 29 that may be engaged in a slot 30 of the adjustable stop arm 27, or otherwise operatively connected therewith. The crank arm 29 is provided with a lever 31 for connection with an operating rod 32 extended to a point within convenient reach of the hand or foot of a person seated on the bicycle or velocipede.

By means of a spring 33 having one end attached to the inner side of the loose disk 7 and its other end attached to or bearing on the cam block 22 that is engaged with the toothed clutch 19 the latter is normally held in locking engagement with the internal gear 16 of the loose ring 15 that forms the periphery of the hollow sprocket wheel. While the sprocket ring 15 and clutch 19 thus remain in locking engagement, under the pressure of the spring 33 on the cam block 22, the gears 6 and 17 will be held from rotation on their axis and will thus clutch said internally toothed sprocket ring with the gear 5 that is fast on the axle 3, thereby binding all the gears together as one body in such manner as to turn only with the cranked axle and permit speeding the vehicle, the sprocket ring 15 being connected, of course, by a suitable chain with the usual sprocket gear on the axle of the driving wheel. If now it should be desired to increase the power imparted to the sprocket wheel, as in propelling the vehicle on an up grade, the rod or lever 32 may be moved in the proper direction to cause the crank arm 29 to throw the stop arm 27 into the path of the crank 26 connected with the cam block 22, so that in the continued rotation of the disk 7 and sprocket ring 15 the crank 26 will be swung outward by contact with the outer slightly curved edge of the arm 27 and will become engaged with a hooked projection at its end thereby arresting the rotation of the disk 7 and holding it immovable. At the same time the outward movement of the crank 26 will swing the cam block 22 and connected clutch or dog 19 into such position as to disengage the clutch from the internal gear 16 of the sprocket ring 15 so that in the continued rotation of the cranked axle 3 its gear 5 will cause the gears 6 and 17 to rotate on their respective axis and thereby increase the power imparted to the sprocket wheel, but with a corresponding reduction in the speed of the vehicle.

One or more sets of gears 6 and 17 may be employed intermediate the axle gear 5 and internally toothed sprocket ring 15 and I may also arrange and suitably connect several clutches 19 in such a manner as to be capable of being simultaneously disengaged from the internal gear 16 by means of a single operating lever.

It will be observed that the clutch 19 has an automatic spring pressed locking engagement with the internal gear 16 of the sprocketed ring 15 that forms the periphery of the hollow sprocket wheel. When the crank lever 26 is raised by the stop lever 27 it acts through the cam block 22 to throw the clutch 19 away from engagement with the internally geared sprocket ring and when the said crank lever is released this spring 33 immediately causes the cam block to carry the clutch into firm locking engagement with the gear 16 so that it cannot be thrown out by pressure of hard riding or by the shocks and jars encountered on rough roads.

The disks 7 and 13 and sprocketed ring 15 together form a hollow sprocket wheel that can be manufactured at comparatively small cost. All the parts of the variable speed and power gearing are brought within a compact space in the casing afforded by the hollow sprocket wheel; the liability to wear and friction is diminished, the gearing is noiseless and easy running; and there being no complicated clutch mechanism the speed and power of the propelling devices can be instantly controlled without dismounting from the vehicle and with no risk of shock, injury or disarrangement in the working devices.

What I claim as my invention is—

1. The combination of the driving shaft provided with a rigidly attached spur gear, a disk rigidly connected with the axle at one side of said spur gear, a loosely mounted disk located at the other side of said axle gear, a sprocket ring provided with an internal gear and loosely mounted on said disks to form the periphery of a hollow sprocket wheel of which said disks are the sides, intermediate gears mounted on the loose disk in position to connect the axle gear with the internal gear of the sprocket ring and constructed of raw hide to render the gearing noiseless, and clutch mechanism to control the locking and unlocking of said gears to vary the speed and power of the sprocket wheel, substantially as described.

2. The combination of the driving shaft provided with a rigidly attached spur gear, a disk rigidly connected with the axle at one side of said axle gear, a loosely mounted disk located at the other side of said axle gear, a sprocket ring provided with an internal gear and loosely mounted on said disks to form the periphery of a hollow sprocket wheel of which said disks are the sides, annular series of ball bearings between said disks and sprocket ring to afford an anti-friction support for the ring, intermediate gears mounted on the loose disk in position to connect the axle gear with the internal gear of the sprocket ring, and clutch mechanism to control the locking and unlocking of said gears to vary the speed and power of the sprocket wheel, substantially as described.

3. The combination of the driving shaft provided with a rigidly attached spur gear, a disk rigidly connected with the axle at one side of said axle gear, a loosely mounted disk located at the other side of said axle gear, ball bearings between the axle and loose disk, a sprocket ring provided with an internal gear and loosely mounted on said disks to form the periphery of a hollow sprocket wheel of which said disks are the sides, ball bearings between said disks and sprocket ring, intermediate gears mounted on the loose disk in position to connect the axle gear with the internal gear of the sprocket ring, a clutch mounted on the loose disk in normal locking engagement with the internal gear of the sprocket ring to bind all the gears together as one body for speeding the sprocket wheel, and mechanism for disengaging said clutch to permit rotation of the intermediate gears on their axis and thereby increase the power and reduce the speed of said sprocket wheel, substantially as described.

4. The combination of the driving shaft or axle provided with a rigidly attached spur gear, a hollow sprocket wheel provided with an internal gear and inclosing the axle gear, a loosely mounted disk closing one side of the hollow sprocket wheel, intermediate gears mounted on said loose disk and connecting the axle gear with the internal gear of the sprocket wheel, a clutch mounted on the loose disk in normal locking engagement with the internal gear of the sprocket wheel to bind all the gears together for speeding said sprocket wheel, a cam block mounted on the loose disk and connected with the clutch, a spring bearing on said cam block to hold the clutch in locked position, a cranked lever connected to said cam block and projecting on the outside of the loose disk, an adjustable stop arm attached to a fixed support, and lever mechanism connected with the stop arm to throw it into the path of the cranked lever on the cam block, whereby the clutch is disengaged from the internal gear of the sprocket wheel to permit rotation of the intermediate gears on their axis so as to reduce the speed and increase the power of the sprocket wheel, substantially as described.

5. The combination of a rigidly supported tubular bracket or axle bearing, a driving shaft or axle supported on ball bearings arranged in said bracket, a spur gear secured to said axle, a disk rigidly connected with the axle at one side of said spur gear, a loosely mounted disk located at the other side of said axle spur gear, ball bearings between the axle and loose disks, a sprocket ring provided with an internal gear and loosely mounted on said rigid and loose disks to form the periphery of a hollow sprocket wheel of which said disks are the sides, ball bearings between said disks and sprocket ring, intermediate gears mounted on the loose disk and connecting the axle gear with the internal gear of the sprocket ring, and clutch mechanism to control the locking and unlocking of said gears to vary the speed and power of the sprocket wheel, substantially as described.

6. The combination of the driving shaft or axle provided with a rigidly attached spur gear, a hollow sprocket wheel provided with an internal gear and comprising a loosely mounted disk that closes one side of said hollow wheel, intermediate gears mounted on said loose disk and connecting the axle gear with the internal gear of the sprocket wheel, a clutch provided with a slot or groove and pivoted to said loose disk in position to engage with the internal gear of the sprocket wheel, a cam block fulcrumed to the loose disk and having a pin engaged in the slot or groove of the clutch, a spring bearing on said cam block to carry the clutch into normal locking engagement with the sprocket wheel gear, a cranked lever on the cam block, an adjustable stop lever attached to a fixed support, and mechanism for throwing said stop lever in the path of the cranked lever on the cam block and to thereby disengage the clutch from the internal gear of the sprocket wheel, substantially as described.

In testimony whereof I have hereunto set my hand and affixed my seal in presence of two subscribing witnesses.

ALFRED B. STEBBINS. [L. S.]

Witnesses:
M. W. DAVISON,
WILLIAM G. PORTER.